United States Patent
Waldspurger et al.

(10) Patent No.: US 7,890,754 B2
(45) Date of Patent: *Feb. 15, 2011

(54) SELECTIVE ENCRYPTION SYSTEM AND METHOD FOR I/O OPERATIONS

(75) Inventors: Carl A. Waldspurger, Palo Alto, CA (US); Matthew Eccleston, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/202,873

(22) Filed: Sep. 2, 2008

(65) Prior Publication Data

US 2008/0320316 A1    Dec. 25, 2008

Related U.S. Application Data (62) Division of application No. 10/448,825, filed on May 30, 2003, now Pat. No. 7,428,636.

(51) Int. Cl.
*H04L 29/06* (2006.01)

(52) U.S. Cl. .......................... 713/164; 713/189; 726/1; 726/22; 726/27

(58) Field of Classification Search .................. 713/189, 713/193, 165; 726/1, 22, 27
See application file for complete search history.

(56) References Cited

U.S. PATENT DOCUMENTS

| | | | | |
|---|---|---|---|---|
| 4,918,653 A * | 4/1990 | Johri et al. | ..................... | 726/23 |
| 5,224,166 A * | 6/1993 | Hartman, Jr. | ................. | 713/190 |
| 5,450,595 A * | 9/1995 | Chen et al. | ......................... | 1/1 |
| 5,784,459 A * | 7/1998 | Devarakonda et al. | ...... | 713/165 |
| 5,995,623 A * | 11/1999 | Kawano et al. | .............. | 713/189 |
| 6,370,619 B1 * | 4/2002 | Ho et al. | ..................... | 711/129 |
| 6,374,266 B1 * | 4/2002 | Shnelvar | ............................. | 1/1 |
| 6,470,423 B1 * | 10/2002 | Ho et al. | ..................... | 711/129 |
| 6,804,819 B1 * | 10/2004 | Bates et al. | .................. | 719/318 |
| 6,922,774 B2 * | 7/2005 | Meushaw et al. | ........... | 713/151 |
| 6,971,018 B1 * | 11/2005 | Witt et al. | .................... | 713/187 |
| 6,986,043 B2 * | 1/2006 | Andrew et al. | .............. | 713/166 |
| 7,010,655 B1 * | 3/2006 | Harmer et al. | .............. | 711/163 |
| 7,149,901 B2 * | 12/2006 | Herbert et al. | .............. | 713/190 |
| 7,152,165 B1 * | 12/2006 | Maheshwari et al. | ......... | 713/193 |
| 2001/0018736 A1 * | 8/2001 | Hashimoto et al. | ............. | 713/1 |
| 2002/0032691 A1 * | 3/2002 | Rabii et al. | .................. | 707/200 |
| 2002/0065924 A1 * | 5/2002 | Barrall et al. | ............... | 709/227 |
| 2002/0069323 A1 * | 6/2002 | Percival | ..................... | 711/113 |

(Continued)

*Primary Examiner*—David García Cervetti
(74) *Attorney, Agent, or Firm*—Jeffrey Pearce (57) ABSTRACT

Upon occurrence of a trigger condition, writes of allocation units of data (including code) to a device, such as writes of blocks to a disk, are first encrypted. Each allocation unit is preferably a predetermined integral multiple number of minimum I/O units. A data structure is marked to indicate which units are encrypted. Upon reads from the device, only those allocation units marked as encrypted are decrypted. The disk protected by selective encryption is preferably the virtual disk of a virtual machine (VM). The trigger condition is preferably either that the virtual disk has been initialized or that the VM has been powered on. Mechanisms are also provided for selectively declassifying (storing in unencrypted form) already-encrypted, stored data, and for determining which data units represent public, general-use data units that do not need to be encrypted. The "encrypt-on-write" feature of the invention may be used in conjunction with a "copy-on-write" technique.

5 Claims, 5 Drawing Sheets

U.S. PATENT DOCUMENTS

| | | | |
|---|---|---|---|
| 2002/0073276 A1* | 6/2002 | Howard et al. | 711/113 |
| 2002/0087883 A1* | 7/2002 | Wohlgemuth et al. | 713/201 |
| 2002/0161908 A1* | 10/2002 | Benitez et al. | 709/231 |
| 2002/0169987 A1* | 11/2002 | Meushaw et al. | 713/201 |
| 2002/0178176 A1* | 11/2002 | Sekiguchi et al. | 707/200 |
| 2003/0009538 A1* | 1/2003 | Shah et al. | 709/219 |
| 2004/0153642 A1* | 8/2004 | Plotkin et al. | 713/150 |
| 2006/0015718 A1* | 1/2006 | Liu et al. | 713/164 |
| 2006/0123250 A1* | 6/2006 | Maheshwari et al. | 713/193 |
| 2006/0136735 A1* | 6/2006 | Plotkin et al. | 713/182 |
| 2008/0072071 A1* | 3/2008 | Forehand et al. | 713/193 |
| 2008/0313128 A1* | 12/2008 | Arasu et al. | 707/2 |

* cited by examiner

SELECTIVE ENCRYPTION SYSTEM AND METHOD FOR I/O OPERATIONS

CROSS-REFERENCE TO RELATED APPLICATIONS

This application is a divisional of U.S. patent application Ser. No. 10/448,825, filed May 30, 2003, now U.S. Pat. No. 7,428,636.

BACKGROUND OF THE INVENTION

1. Field of the Invention

This invention relates to the general field of input/output (I/O) operation within a computer and in particular to the encryption of data transferred to an I/O device.

2. Description of the Related Art

As computers have proliferated in both offices and homes, the need for data security has increased. Not only do large entities worry about protecting confidential information against unauthorized access, but as more and more computers—even in homes—are constantly connected to the Internet via "always on" broadband devices, even the computers of private individuals have become vulnerable to unauthorized penetration and probing.

Firewalls are a common means of protection, but even they are not always impenetrable. Even if they were, there may still be those inside the firewall who are not authorized to access certain data stored on either the computers they work with or on some shared storage medium that they can access.

The most reliable way to protect sensitive data is to encrypt it. Accordingly, several encryption mechanisms have been proposed. One known technique requires specialized, dedicated hardware to be installed either as an interface between a hard disk controller and all sub-systems that access the disk, or as part of the disk controller itself—all data to be written to the disk is first encrypted in hardware. This solution, although fast, has drawbacks. Most obvious is the requirement to install additional hardware, which will often prove to be impractical, expensive, inconvenient or impossible depending on the system in which it is to be included. Another disadvantage is lack of flexibility, since the encryption device may not be able to work with all different disks or disk controllers; moreover, it is difficult to change or upgrade, for example, the encryption algorithm when encryption is implemented in hardware.

Many software-based encryption solutions are also known. A well-known problem with software-based encryption techniques, however, is that encryption and decryption impose additional software overhead, primarily the CPU cycles consumed by the computationally intensive cryptographic operations. Other sources of overhead may include memory system effects, such as additional cache or TLB (translation lookaside buffer) misses. Such overhead may reduce I/O throughput and increase I/O latencies, reducing overall system performance.

Existing software-based encryption tends to be "all or nothing," albeit often at the level of applications or files. In many cases, however, a user does not need to encrypt all of the data stored on a disk. For example, the program code defining commodity operating systems such as Linux or Windows and common applications such as Mozilla or Microsoft Office usually does not need to be encrypted even if the data the code generates may need to be. As another example, there will in most cases be no need to encrypt the code defining a financial management program, whereas it might be highly desirable to encrypt the user-entered financial data that is stored as a result of running the program.

One way to avoid all-or-nothing encryption is to require the user to specify which files are to be encrypted, when the files are not in use. In other words, the user opens the encryption software and specifies which files it is to operate on. The software then encrypts the selected files. This is not only a cumbersome process, but it is not always even obvious to users which files contain the sensitive data. Yet another problem with explicitly specifying files is that the granularity is poor—like whole-disk, whole-file is often too large of a unit. For example, it may be desirable to encrypt only small private changes to a large database file containing mostly public data. Furthermore, sub-file granularity is difficult for end-users to specify.

An additional problem associated with encrypting non-sensitive data is that it precludes (or at least complicates) optimizations that attempt to eliminate duplicate copies by sharing a single instance of common data. This is because different users will use different encryption keys, so that data which is identical before encryption will be completely different after encryption.

What is needed is therefore a software mechanism for I/O data encryption (including data to be written to a disk) that avoids incurring the overhead associated with needlessly encrypting and decrypting "non-sensitive" data, such as the commonly available data (including the concept of code) associated with a fresh install, on every subsequent access to that data. The mechanism should also be either easy for a user to control, or not require user control at all. This invention provides such a mechanism in the form of a system of software modules and a method for operating them.

SUMMARY OF THE INVENTION

The invention provides a system and a method of operation for securely storing allocation units of data in a device in a computer system, where the device may be physical or virtual and has a minimum I/O unit. When the system senses a trigger condition, allocation units of data are encrypted when they are written to the device. Each allocation unit comprises a predetermined integral multiple number of minimum I/O units. The system then indicates in a data structure whether the allocation units stored in the device are encrypted and it decrypts data read from the device only from those allocation units marked as encrypted. In the preferred embodiment of the invention, the device is a persistent storage medium such as a disk.

The preferred embodiment of the invention is implemented in a virtualized computer system, which comprises a host physical platform that includes a physical persistent storage medium; a virtual machine (VM) that includes a guest operating method and a virtual persistent storage medium; and an intermediate software layer (such as a virtual machine monitor) forming an interface between the virtual machine and the host physical platform. The device to which allocation units are encrypted upon being written is then the virtual persistent storage medium.

Different trigger conditions may be used to start the "encrypt-on-write" (EOW) mechanism according to the invention. In a virtualized system, for example, the trigger condition may be that the VM is powered on, or that the virtual persistent storage medium has been initialized, or that a designated user is currently using the VM. A different possible trigger condition is that the device is a predetermined one of a plurality of devices connected to or within the computer system.

According to one refinement of the invention, encryption of allocation units of data written to the virtual persistent storage medium is suspended during loading of non-sensitive data allocation units into the virtual machine while the virtual machine is powered on.

The invention may also be combined with a copy-on-write (COW) mechanism, whereby an initial state of the virtual persistent storage medium is stored in a first storage region. After storage of the initial state, for each allocation unit of data to be written by the guest operating system to the virtual persistent storage medium, each such allocation unit is then encrypted and stored in a second storage region.

The invention also preferably allows for dynamic transitioning back to a non-sensitive state, in which, upon occurrence of a transition condition, subsequent writes to the persistent storage medium are done with encryption only for allocation units that have been previously encrypted and are already stored in encrypted form. The system may then automatically transition back to a sensitive state, in which all writes to the persistent storage medium are first encrypted, upon any access to an already-encrypted allocation unit.

The invention also provides a mechanism for determining whether a given test allocation unit of data corresponds to public, non-sensitive, general-use data that need not be encrypted: As a first step, a database of identifiers of allocation units of known, general-use data is compiled. The system then determines whether the test allocation unit corresponds to any identifier of allocation units of general-use data in the database. In the preferred embodiment of this aspect of the invention, each test allocation unit is an allocation unit of data currently to be written to the persistent storage medium and the database is a hash table. The step of compiling the database of identifiers then comprises computing a hash value for a plurality of known general-use allocation units and making an entry in the hash table corresponding to the hash value.

The mechanism for determining whether a given test allocation unit of data corresponds to general-use data can also be used to "declassify" already encrypted, stored allocation units of general-use data by identifying them as such and converting them into unencrypted form. The conversion step preferably comprises reading in, decrypting, and then overwriting the encrypted allocation units back to the persistent storage medium in decrypted form; and indicating in the data structure that the overwritten, decrypted allocation units are unencrypted.

The known general-use allocation units include program code and may in fact be portions of a plurality of known executable files.

The data structure that indicates whether an allocation unit of data has been encrypted, and the various mechanisms for encryption/decryption, for comparing test units with the database, etc., are preferably implemented as a cached array (the data structure) and modules of a computer program incorporated in the intermediate software layer of the virtualized computer system. The entire selective encryption mechanism according to the invention can then be transparent to the VM and to its user, and can be independent of the guest operating system of the VM.

DETAILED DESCRIPTION

In broadest terms, the preferred embodiment of the invention involves an "encrypt-on-write" (EOW) mechanism for the virtual disk(s) of a virtual machine. The invention may be extended to non-virtualized systems and may also be combined with a disk "copy-on-write" (COW) mechanism to make possible "encrypt-and-copy-on write" (ECOW). After initial installation on the disk, non-sensitive data that is only ever read may be excluded from encryption.

In this application, unless otherwise made clear, the term "data" is meant to include all digital information written to either a volatile memory device or to a persistent mass-storage device. Thus, the term "data" should be read as including not only such non-executable information as parameters and constants, but also the digital representations of program code, that is, computer instructions. This definition is consistent with the way in which information is typically stored in devices—all bytes, words, etc., are stored in the same form. The only core assumptions of the invention are that the data is stored and accessed in allocation units (such as disk blocks) that are uniquely identifiable (for example, indexed by block number) and that it is possible to associate encryption metadata with the data.

Data is assumed to be of either of two types: "public," "unclassified," "non-sensitive," or "general use," data that does not need to be encrypted, typically because it contains only information that is not specific to any particular user and will usually be accessible by other users by other means than accessing the disk; and "private," "classified," or "sensitive" or "user-specific" data that does need to be encrypted. In other words, the invention is most useful where whole-disk encryption is undesirable.

Since the preferred embodiment of the invention is implemented in a virtualized computer system, it is helpful to review the main features of such a system.

General Virtualized Computer System

The advantages of virtual machine technology have become widely recognized. Among these advantages is the ability to run multiple virtual machines on a single host platform. This makes better use of the capacity of the hardware, while still ensuring that each user enjoys the features of a "complete," isolated computer. Depending on how it is implemented, virtualization also provides greater security since it can isolate potentially unstable or unsafe software so that it cannot adversely affect the hardware state or system files.

As is well known in the field of computer science, a virtual machine (VM) is a software abstraction—a "virtualization"—of an actual physical computer system. A virtual machine 500 is installed as a "guest" on a "host" hardware platform 100. Two configurations are in general use—a "hosted" configuration, illustrated in FIG. 1, in which an existing, general-purpose operating system (OS) forms a "host" OS that is used to perform certain I/O operations; and a non-hosted configuration, illustrated in FIG. 2, in which a kernel customized to support virtual computers takes the place of the conventional operating system. The main components of these two configurations are outlined below. This invention works with either configuration.

Figure 1:
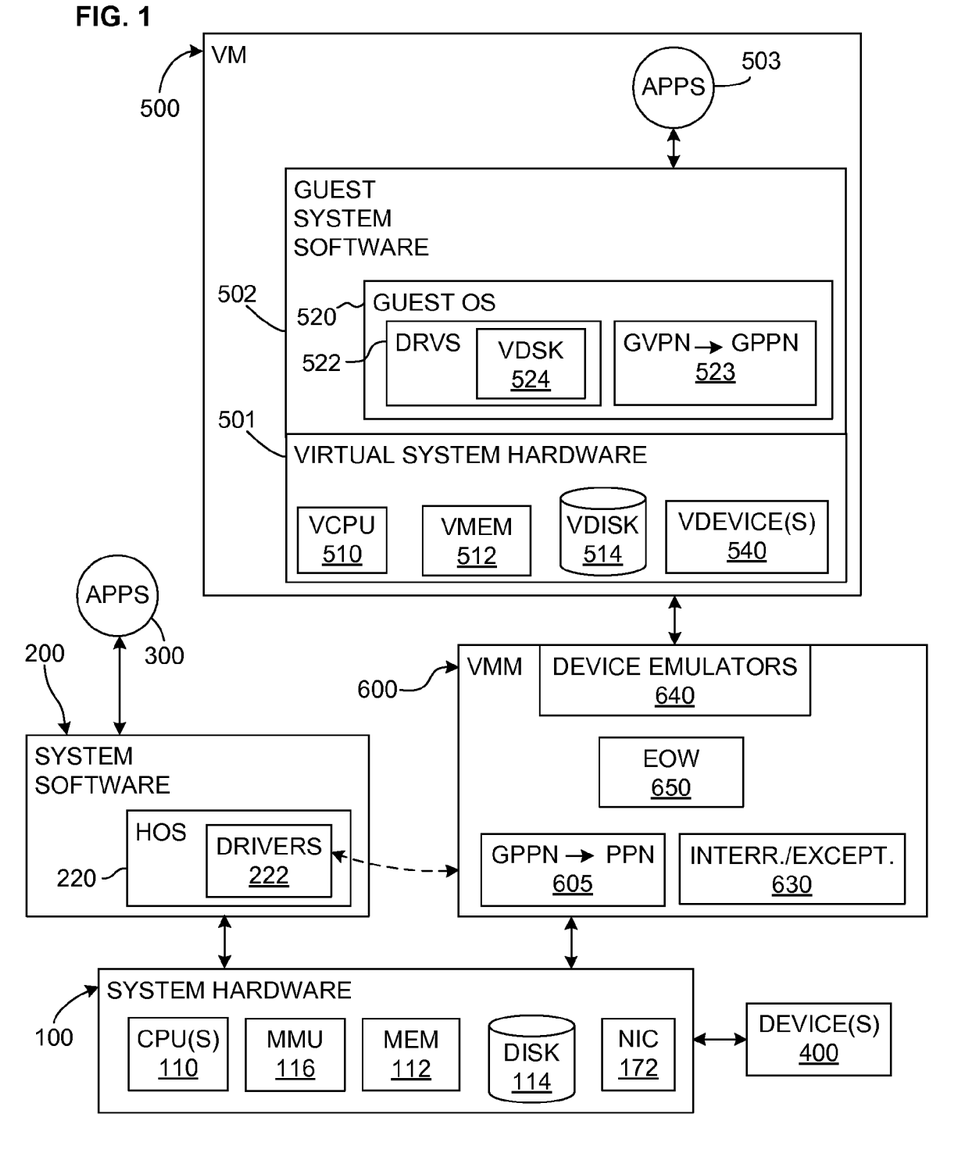
FIG. 1 illustrates the main software and hardware components of a hosted virtual computer.

As FIG. 1 shows, the hardware platform 100 includes one or more processors (CPUs) 110, system memory 112, and a storage device, which will typically be a disk 114. The system memory will typically be some form of high-speed RAM, whereas the disk (one or more) will typically be a non-volatile ("persistent") mass storage device. The hardware 100 will also include other conventional mechanisms such as a memory management unit MMU 116, and one or more conventional network connection device(s) 172 (such as a network adapter or network interface card—"NIC") for transfer of data between the various components of the system and a bus or network.

System software 200 includes a host operating system 220, which will include drivers 222 as needed for various connected devices 400. The user's monitor and input devices such as a keyboard, mouse, trackball, touchpad, etc, are usually also included among the devices for obvious purposes. The host operating system (OS) may be any known OS and will therefore have all typical components.

Each VM 500 will have both virtual system hardware 501 and guest system software 502. The virtual system hardware typically includes at least one virtual CPU 510, virtual system memory 512, at least one virtual disk 514, and one or more virtual devices 540. Note that a disk—virtual or physical—is also a "device," but is usually considered separately because of its essential role. All of the virtual hardware components of the VM may be implemented in software using known techniques to emulate the corresponding physical components. The guest system software includes a guest operating system 520 (which may simply be a copy of a conventional operating system), and drivers 522 as needed for the various virtual devices 540; in particular, a driver VDSK 524 will be included to manage access to the virtual disk 514.

If the VM is properly designed, then it will not be apparent to the user that any applications 503 running within the VM are running indirectly, that is, via the guest OS and virtual processor. Applications 503 running within the VM will act just as they would if run on a "real" computer, except for a decrease in running speed that will be noticeable only in exceptionally time-critical applications. Executable files will be accessed by the guest OS 520 from the virtual disk or virtual memory, which will simply be portions of the actual physical disk or memory allocated to that VM. Once an application is installed within the VM, the guest OS retrieves files from the virtual disk just as if they had been pre-stored as the result of a conventional installation of the application. The design and operation of virtual machines is well known in the field of computer science.

Some interface is usually required between a VM and the underlying host platform (in particular, the CPU), which is responsible for actually executing VM-issued instructions and transferring data to and from the actual memory 112 and storage devices 114. A common term for this interface is a "virtual machine monitor" (VMM), shown as component 600. A VMM is usually a thin piece of software that runs directly on top of a host, or directly on the hardware, and virtualizes all, or at least some of, the resources of the physical host machine. The interface exported to the VM is then the same as the hardware interface of the machine (or at least of some machine), so that the guest OS cannot determine the presence of the VMM.

The VMM 600 also usually tracks and either forwards (to some form of operating system) or itself schedules and handles all requests by its VM for machine resources, as well as various faults and interrupts. A mechanism known in the art as an exception or interrupt handler 630 is therefore included in the VMM. As is well known, such an interrupt/exception handler normally includes an interrupt descriptor table (IDT), or some similar table, which is typically a data structure that uses information in the interrupt signal to point to an entry address for a set of instructions that are to be executed when the interrupt/exception occurs.

Although the VM (and thus the user of applications running in the VM) cannot usually detect the presence of the VMM, the VMM and the VM may be viewed as together forming a single virtual computer. They are shown in FIG. 1 as separate components for the sake of clarity. There may be several VM/VMM pairs (virtual computers) running on a common host; a single VM/VMM pair is shown in FIG. 1 for simplicity.

Moreover, the various virtualized hardware components such as the virtual CPU(s) 510, the virtual memory 512, the virtual disk 514, and the virtual device(s) 540 are shown as being part of the VM 500 for the sake of conceptual simplicity—in actual implementations these "components" are usually constructs or emulations exported to the VM by the VMM, for example, as emulators 640. One advantage of such an arrangement is that the VMM may be set up to expose "generic" devices, which facilitate VM migration and hardware platform-independence.

The configuration illustrated in FIG. 1 is used in the Workstation product of VMware, Inc., of Palo Alto, Calif. In this configuration, the VMM 600 is co-resident at system level with the host operating system 220 such that both the VMM and the host OS can independently modify the state of the host processor. However, the VMM calls into the host OS (symbolized by the dashed, double-ended arrow) via a special one of the drivers 222 and a dedicated one of the user-level applications 300 to have the host OS perform certain I/O operations of behalf of the VM. The virtual computer in this configuration is thus hosted in that it runs on an existing host hardware platform together with an existing host OS. A hosted virtualization system of the type illustrated in FIG. 1 is described in U.S. Pat. No. 6,496,847 (Bugnion, et al., "System and Method for Virtualizing Computer Systems," 17 Dec. 2002), which is incorporated here by reference.

Figure 2:
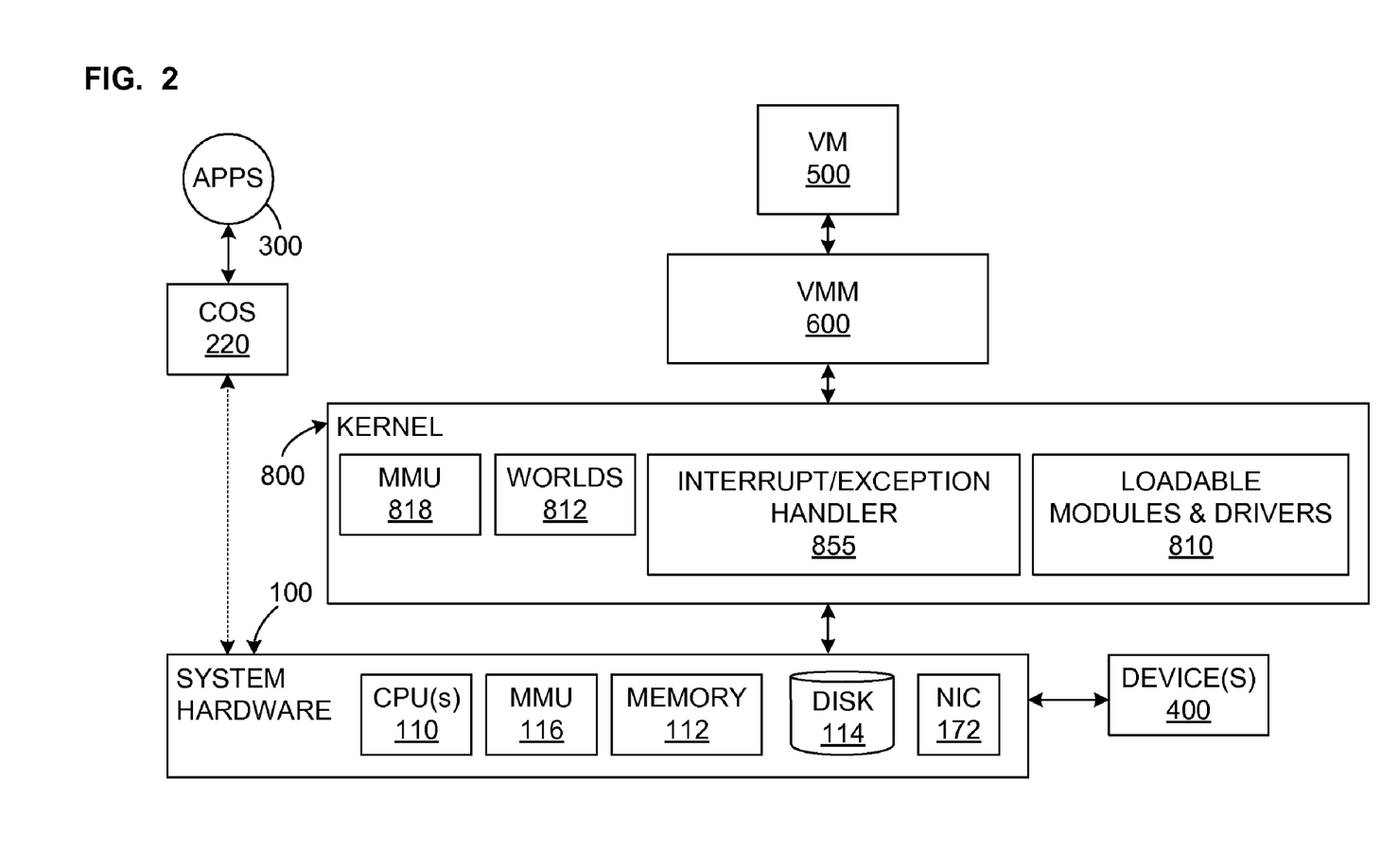
FIG. 2 illustrates a virtual computer running on a system-level kernel.

In other implementations, a dedicated kernel takes the place of and performs the conventional functions of the host OS, and virtual computers run on the kernel. FIG. 2 illustrates such a configuration, with a kernel 800 that serves as the system software for several VM/VMM pairs 200/300, . . . , 200n/300n. Compared with a system in which VMMs run directly on the hardware platform, use of a kernel offers improved performance for I/O operations and facilitates provision of services that extend across multiple VMs (for example, for resource management).

At boot-up time, an existing operating system 220 (which may be of the same type as the host OS 220 in the configuration of FIG. 1) may be at system level and the kernel 800 may not yet even be operational within the system. In such case, one of the functions of the OS 220 may be to make it possible to load the kernel 800, after which the kernel runs on the native hardware 100 and manages system resources. In effect, the kernel, once loaded, displaces the OS 220. Thus, the kernel 800 may be viewed either as displacing the OS 220 from the system level and taking this place itself, or as residing at a "sub-system level." When interposed between the OS 220 and the hardware 100, the kernel 800 essentially turns the OS 220 into an "application," which has access to system resources only when allowed by the kernel 800. The kernel then schedules the OS 220 as if it were any other component that needs to use system resources.

The OS 220 may also be included to allow applications unrelated to virtualization to run; for example, a system administrator may need such applications to monitor the hardware 100 or to perform other administrative routines. The OS 220 may thus be viewed as a "console" OS (COS). In such implementations, the kernel 800 preferably also includes a remote procedure call (RPC) mechanism and/or a shared memory area to enable communication, for example, between the VMM 600 and any applications 300 installed to run on the COS 220.

Compared with the hosted deployment, a kernel may offer greater performance because it can be co-developed with the VMM and be optimized for the characteristics of a workload consisting of VMMs. The ESX Server product of VMware, Inc., has such a configuration. A kernel-based virtualization system of the type illustrated in FIG. 2 is described in U.S. patent application Ser. No. 09/877,378 ("Computer Configuration for Resource Management in Systems Including a Virtual Machine"), which is also incorporated here by reference.

Virtual and Physical Memory

As in most modern computers, the address space of the memory 112 is partitioned into pages (for example, in the Intel x86 architecture), regions (for example, Intel IA-64 architecture) or other analogous allocation units. Applications then address the memory 112 using virtual addresses (VAs), each of which typically comprises a virtual page number (VPN) and an offset into the indicated page. The VAs are then mapped to physical addresses (PAs), each of which similarly comprises a physical page number (PPN) and an offset, and which is actually used to address the physical memory 112. The same offset is usually used in both a VA and its corresponding PA, so that only the VPN needs to be converted into a corresponding PPN.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in region-based architectures or, indeed, in any architecture where relocatability is possible.

An extra level of addressing indirection is typically implemented in virtualized systems in that a VPN issued by an application 503 in the VM 500 is remapped twice in order to determine which page of the hardware memory is intended. The first mapping is provided by a mapping module 523 within the guest OS 520, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory 112 must ultimately be generated. A memory management module 605, located typically in the VMM 600, therefore performs the second mapping by taking the GPPN issued by the guest OS 520 and mapping it to a hardware (or "machine") page number PPN that can be used to address the hardware memory 112. This GPPN-to-PPN mapping may instead be done in the main system-level software layer (such as in a mapping module in a memory management unit 818 in the kernel 800), depending on the implementation: From the perspective of the guest OS, the GVPN and GPPN might be virtual and physical page numbers just as they would be if the guest OS 520 were the only OS in the system. From the perspective of the system software, however, the GPPN is a page number that is then mapped into the physical memory space of the hardware memory as a PPN.

The addressable space of the disk(s) 114, and therefore also of the virtual disk(s) 514, is similarly subdivided into separately identifiable portions such as blocks or sectors, tracks, cylinders, etc. In general, applications do not directly address the disk; rather, disk access and organization are tasks reserved to the operating system, which follows some predefined file system structure. When the guest OS 520 wants to write data to the (virtual) disk 514, the identifier used for the intended block, etc., is therefore also converted into an identifier into the address space of the physical disk 114. Conversion may be done within whatever system-level software layer that handles the VM, either the VMM 600, the host OS 220 (under direction of the VMM), or in the kernel 800.

Disk Portions

Data in a persistent storage device such as a disk (or flash memory or tape, etc.) is written to and read from the disk in some smallest I/O unit such as blocks (also known as "sectors"). For the sake of simplicity, the term "disk" (including a virtual disk) is to be understood as meaning any form of persistent data storage device, regardless of the "shape" or technology used for the storage.

The disk may also be addressable in larger units such as tracks and cylinders, which comprise several blocks. Conversely, the smallest I/O unit (block) usually comprises several still smaller units (in particular, bytes) that are separately addressable when the block is loaded into memory. Any disk granularity may be specified for encryption by the EOW mechanism according to the invention. Because most common operating systems perform disk reads and writes at the granularity of blocks, the block is also the preferred encryption unit, that is, the amount of data that is used as the input to a single encryption operation and that produces a single corresponding encrypted output.

It is not necessary according to the invention for the smallest I/O unit to be identical to the smallest encryption unit. For example, in some devices, the minimum I/O unit might be larger than the minimum encryption unit. The invention may handle this situation simply by reading in and encrypting the I/O unit (or some other superset of data) that includes the desired encryption unit, and then re-storing the encrypted result, even though this may mean re-encrypting previously encrypted data or even encrypting some data that may not need to be encrypted.

Conversely, depending in part on the chosen encryption algorithm, the minimum I/O unit could also be smaller than the minimum encryption unit. In such case, the system according to the invention could read in however many I/O units are needed for encryption, then encrypt, then write the entire encrypted unit out.

Merely for the sake of simplicity, it is assumed below that the encryption unit is the same as the minimum I/O unit, that is, a disk block. This does not reduce the generality of the invention, since it will be obvious to skilled programmers how one may overcome such mismatches in data units, such as by using superset encryption as mentioned above.

As mentioned above, depending on which device (for example, disk) that the invention is to operate with, it is not necessary for the encryption unit to be the same as the minimum I/O unit. Assume that the minimum size of the data set that the invention is designed to encrypt/decrypt at one time and write to/read from the device is an "allocation unit"—an allocation unit may be encrypted or not, but will still be written to the disk as a unit. In general, the allocation unit the invention uses may be any predetermined, preferably uniform, integral (including one) multiple number of the minimum I/O units. For higher-level abstractions or data sets such as files or directories, the invention will then include any conventional mechanism for mapping these higher-level sets to the lower-level allocation units. The allocation unit's size is "predetermined" in the sense that it must be suitable for the chosen encryption routine and should be easy for the operating system to access. The preferred size of the allocation unit for any given implementation of the invention may be chosen following normal design considerations. In the simplest, preferred embodiment of the invention, the allocation unit is also a disk block.

Metadata

The term "metadata" is commonly used to describe the data that describes the nature or structure of other data. For example, the structure of the contents of a disk is defined by metadata that is created by and available to the system-level software that is responsible for actual I/O operations to the disk. In conventional, non-virtualized computers, the operating system creates, stores (also on disk) and usually has exclusive access to the metadata. In virtualized systems, the guest OS 520 will similarly create metadata defining the structure of the contents of the virtual disk 514.

As implemented in the virtualization products of VMware, Inc., the virtual disk 514 (including "delta" or COW disks—see below) is stored on the physical disk 114. In some implementations, the entire virtual disk 514 is stored as a single file on the physical disk 114. In other implementations, especially where the host limits the file size, the virtual disk is stored in a plurality of files on the physical disk. In still other implementations, a plurality of virtual disks is stored on the physical disk, either as a single file or a set of files. Without loss of generality, assume that the name of the file(s) used to stored the virtual disk(s) is vmfile. Metadata defining vmfile is created and used by the VMM. For example, when an application 503 in the VM wants to save a file to disk, the guest OS 520 decomposes it into a set of blocks, which it writes to the virtual disk 514. The guest OS then updates its metadata accordingly so that it can later find each of the newly saved blocks on what it believes is a "real" physical disk.

From the perspective of the VMM, however, the newly created data blocks—as well as the corresponding metadata—are simply additions or modifications to the already existing file vmfile; the VMM then updates its metadata so that it can find the newly created blocks. From the perspective of the VMM, the metadata generated by the guest OS is just more "regular" data that is stored as any other in vmfile; thus, the guest VMM's metadata will also describe the location of the guest OS's metadata. The host system software (for example, the host OS 220 or kernel 800) will then decompose vmfile into blocks, which are stored on the physical disk; the host's metadata is then updated accordingly.

In a virtualized computer, "metadata" thus occurs on three different levels: 1) "guest metadata," which describes the organization of the virtual disk 514 from the perspective of the guest OS 520; 2) the "VMM metadata," which the VMM creates to describe the organization of vmfile; and 3) the "host metadata," which describes the organization of the physical disk, including the portion of metadata relating to vmfile.

Unless otherwise specified, the term "metadata" is to be understood below as referring to the VMM metadata. The key point to keep in mind in the context of this invention is that the VMM metadata is created and controlled by the VMM, so that it can read, write, change, add to and subtract from it as needed.

Selective Encryption on Write

Figure 3:
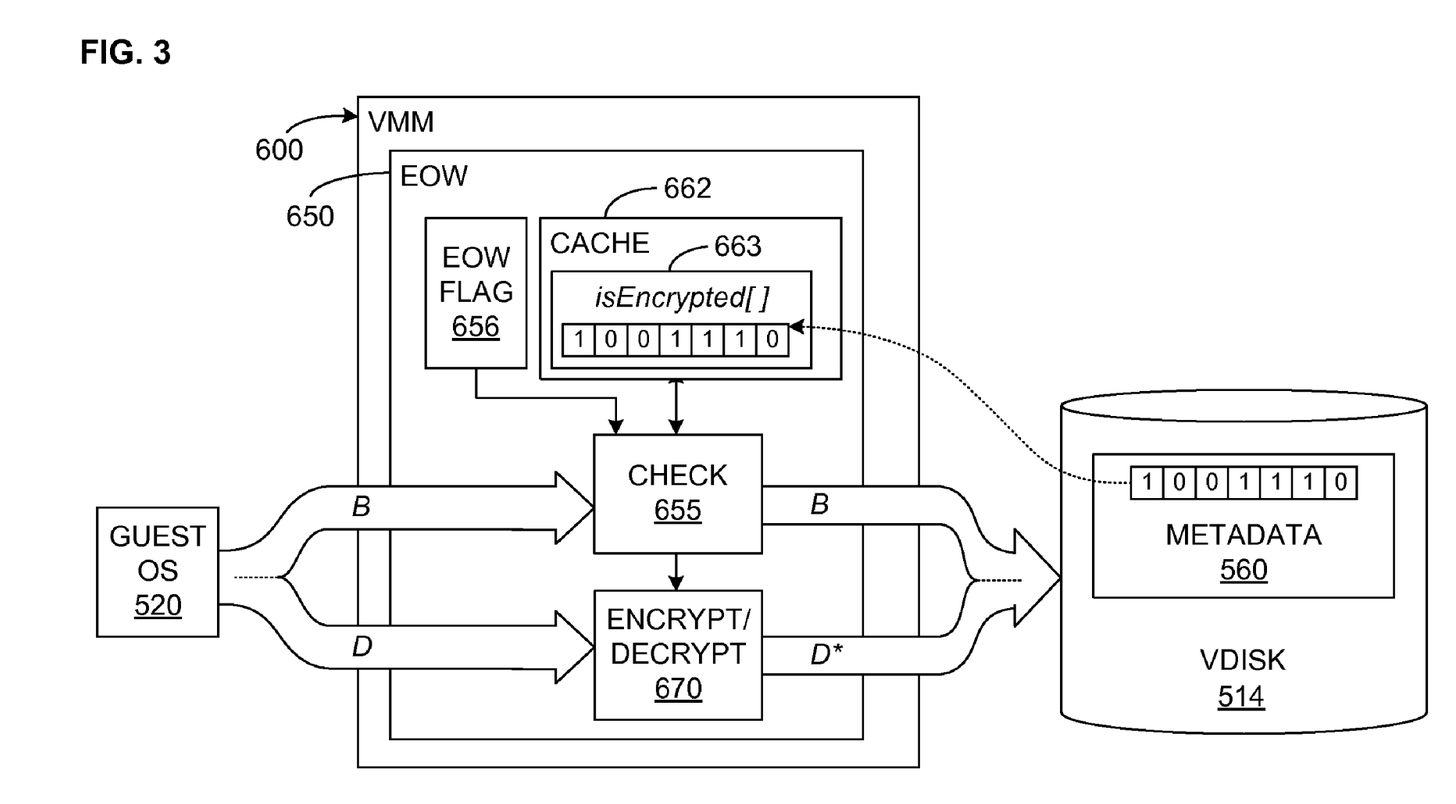
FIG. 3 illustrates, conceptually, the path by which data is transferred between a virtual machine and an I/O device and is selectively encrypted according to the invention.

FIG. 3 illustrates the main features of the preferred embodiment of the invention, which are embodied as a computer program comprising computer-executable instructions within an EOW module 650 in the VMM. When the guest OS 520 writes to the virtual disk 514, an encryption routine within an encryption/decryption module 670, using any known algorithm, encrypts the data (shown as D) to be written. Examples of suitable algorithms include those widely known as DES, AES and Blowfish. The encrypted data (shown as D*) is then written to the virtual disk 514 at the location specified by its corresponding block identifier B. If no encryption is to be performed, then D will be used directly instead of D*, since no encryption will be necessary.

In certain alternative embodiments of the invention, encryption is not done for all disk blocks modified after a certain time, but rather for all modified blocks that fall in a certain range or specified set or are otherwise designated for encryption. In this case, a check module 655 is preferably included to examine a data structure to determine whether data to be written to block B is to be encrypted. It would also be possible to check the mapped physical block identifier (derived using a conventional map) instead. In most cases, it will not matter which block identifier is used because there is usually a one-to-one mapping, although this may change due to such host actions as defragmentation of the physical disk on which vmfile is stored. In some other cases in which mechanisms such as copy-on-write or "delta disks" (see below) are implemented, using virtual block identifiers to decide whether to encrypt will work more easily. The choice of which type of block identifiers to use (virtual or physical) can be made easily by skilled programmers.

Triggering of EOW

In contrast with many existing encryption techniques, the invention does not necessarily require encryption of all written data, and not necessarily all data defining a particular application or even file. The question then arises as to how a user of the invention can specify what is to be encrypted and/or when. Thanks to its flexibility, the invention has several different answers to this question.

A first-level determination is whether EOW according to the invention should be performed at all. Certain operations described below require EOW to be at least temporarily discontinued, for example. A flag 656 is therefore preferably included in the EOW module 650 to indicate whether EOW should be done or whether data should be written to the virtual disk without encryption. The flag 656 may be implemented as a single bit or may be expanded to be or augmented with a flag vector (see below); the use of flags is of course well understood by programmers.

The preferred embodiment of the invention is implemented in a virtual computer, hosted or non-hosted. When a virtual machine is first created, the parameters defining the virtual disk are passed to whatever system-level software layer(s) (the VMM, the kernel, etc) is responsible for configuring the virtual disk 514 on the physical disk 114. As part of VM installation, the guest system software 502 and applications 503 are also installed just as in a physical machine. When the VM is powered on, the guest system software 502 and any startup applications are also loaded exactly as they would be in a physical machine. The user may also choose to load other applications as well, again, just as if the machine were non-virtualized.

In the preferred implementation of the invention, the user will start with an empty virtual disk 514 and with the EOW flag OFF. Next, the user will install the guest OS 520 and desired applications 503, all of which may be assumed to be non-sensitive. Since the EOW flag is OFF, all blocks are stored without encryption. The user then sets the EOW flag 656 ON and may start entering personal data.

As a practical example, a fresh installation of Windows XP, Office XP, and TurboTax may consume hundreds of megabytes of disk space that need not be encrypted. With the EOW flag OFF as this software is loaded, the corresponding disk blocks will not be encrypted when written to the virtual disk. When the EOW flag is then turned on and the user runs, for example, TurboTax, he may rest assured that any personal information written to disk will be protected by encryption, while disk accesses to the TurboxTax application, Windows OS, and any other unmodified data from the original system installation can proceed without incurring any decryption penalty.

The processes of installing and powering on a VM, and of loading and running applications within the VM, thus present several different points at which a user might want to begin encrypting data written to the virtual disk: Upon creation of the VM, immediately after the VM is powered on, after one or more applications have loaded, or at some user-specified time while working with one of the running applications. Indeed, the invention may be configured such that user may choose the time at which to start encryption-on-write more or less arbitrarily. As the "cleanest," most easily implemented default, EOW is preferably activated at any time after an initial installation of the guest OS 520 and of any applications 503, but before the user enters any personal data when using the VM.

The user may occasionally wish to install new or updated software or load some unclassified set of data from a database. In order to prevent the non-sensitive data blocks of the new software (or database data) from incurring the overhead of encryption and decryption, the user can turn EOW OFF before the installation is started and turn EOW back on when the installation is finished.

Encrypt-on-write according to the invention need not be purely time-dependent, however, but may also—or instead—be made storage portion-dependent. For example, the user might mark one or more files or directories such that all writes to any of these are encrypted. Application-dependent EOW would also be possible. All disk writes after the application begins running could be subjected to EOW.

It would also be possible to activate EOW depending on the current user. For example, all data written to disk by an Administrator, or by any user(s) with a higher security level than others, or by employees who work with sensitive personnel or medical or financial information, or simply any user on a list, could be encrypted upon every write to the virtual disk.

Encrypt-on-write according to the invention may also be made device-dependent such that only writes to one or more drives (for example, a floppy drive or writeable CD-ROM device or Zip drive or flash memory) could be encrypted.

Of course, it would be possible to combine two or more of the "encryption-activation triggers" just described: time-dependent, user-dependent, application-dependent and/or device-dependent. For example, the VMM could activate EOW only for data written by a particular manager using Excel into any part of a "Briefcase" folder on a floppy disk. The condition that causes EOW to be activated may therefore include any, or any combination, of the triggers described above, or any other triggers that indicate some action or state meaningful to the system designer.

One advantage of initiating encrypt-on-write according to the invention as soon as the virtual disk is initialized or the VM is powered on is that this allows the EOW feature to be completely independent of and transparent to the user. Moreover, no modifications need to be made to the VM as configured by the user, with no additional applications or guest drivers.

Even in implementations in which the user is to be given control over the time or extent of EOW, it will usually not be necessary to modify the guest OS 520 kernel at all; rather a driver or agent installed in the guest OS will typically suffice to provide the needed functionality and create a transparent connection to the EOW module in the VMM. The use of such drivers to enable transparent communication with modules in the VMM is a known technique and is found in VMware products to enable other features. The best balance between VMM transparency and user control of the EOW mechanism will depend on the purposes and needs of each given implementation and can be can be determined using known methods for system design.

Many different methods may be used to enable the user to activate EOW according to the invention. In systems where EOW is activated automatically after the VM is powered-on, there will be no need for the user to do anything in order to select what is to be encrypted on writes to the virtual disk—all writes to the virtual disk will usually be encrypted.

If the user is to be given control of the EOW feature according to the invention, then any standard method may be included in the VM to enable the user to turn EOW ON and OFF (set and clear the EOW flag 656). For example, an icon may be placed in any convenient place on the user's display screen, or an entry in a pull-down menu may be created. Clicking on the icon or checking the pull-down entry could then be used to toggle or select activation and deactivation of EOW; while activated, all subsequent writes to the virtual disk will then be encrypted. It would also be possible to display for the user some standard indication (such as an icon) that EOW is operating, without giving the user the ability to turn it on or off.

If specific files or directories are to be protected using EOW, then the user may also specify these using any known method. Examples include highlighting them on a standard view of directories and files, or checking check boxes next to their names, or dragging and dropping their icons into a region of a display screen designated as "protected." The user could then turn EOW OFF with respect to these files by undoing whatever operation he used to turn it on.

If such selective, partial EOW is implemented, then the EOW flag 656 should preferably be expanded or augmented with an EOW flag vector or array whose elements indicate whether a corresponding block, file, directory, etc., should be protected with EOW. The single EOW flag 656 could then be a "global" flag, indicating whether EOW should be allowed at all, with the EOW flag vector indicating what should be treated as EOW if EOW is on.

One of the advantages of the preferred embodiment of the invention, in which EOW is implemented for writes by a VM, is that the VMM is always interposed between the guest OS on the one hand and the physical memory and physical devices such as the physical disk on the other hand. Moreover, a VMM will already have a mechanism for GPPN-to-PPN memory mapping, as described above, as well as an analogous mechanism for address transformations for virtual disk operations. This gives the VMM access to much of the information that identifies the context in which the user is working while still remaining transparent to the user and the guest OS.

Marking Protected Blocks

There must be some way for the invention to determine whether a block has been encrypted so that it will know to decrypt it on reads. In the preferred embodiment of the invention, the VMM creates a data structure such as a bit array 663, which is alternatively referred to below as is Encrypted[•], indexed by block number B. This bit array 663 is preferably included as part of the VMM metadata and, when the VM is powered on, is loaded in a cache 662. The VMM metadata will identify the number and location of blocks so that the VMM can readily construct the is Encrypted[•] vector using known methods.

As needed, more than one bit may be assigned for each block, although only one bit is all that is needed to implement the preferred embodiment of the invention. For each block B, the bit is Encrypted[B] specifies whether the corresponding block data has been encrypted. For example, a "1" could indicate that the corresponding block data is encrypted and must be decrypted when read.

When the EOW mechanism according to the invention is first set up, all bits of is Encrypted[•] are preferably set to "0." Upon every write of a block to the virtual disk, the block's data is encrypted and the corresponding bit in is Encrypted[•] is changed to a "1." The status of the array bits in this case does not determine whether writes are to be encrypted or not, since it's assumed that all writes are when EOW is ON. Each bit in is Encrypted[•] is still needed, however, so that the VMM will know whether data read from the virtual disk 514 must be decrypted before being passed to the guest OS: any disk block B whose is Encrypted[B] bit is "1" must be decrypted whereas those marked "0" do not need to be.

Since the vector is Encrypted[•] is preferably part of the persistent VMM metadata, indications of disk writes will accumulate over different sessions of the VM. In other words, powering down the VM preferably does not "reset" is Encrypted[•]; otherwise the VMM would not know to decrypt encrypted disk blocks.

Maintaining Encryption when EOW is OFF

Even with the EOW 656 flag OFF, encryption is preferably maintained for blocks that have previously been encrypted. In other words, with EOW OFF, a write to an unencrypted block will not cause it to become encrypted, but a write to an encrypted block will not cause it become unencrypted either. The vector is Encrypted[•] contains information sufficient to identify already-encrypted blocks, so that if the bit is Encrypted[B] for block B is set, then this will "override" the fact that the EOW flag 656 may be OFF upon any write to block B.

Dynamic Transition to Non-sensitive State

Various extensions to the basic EOW scheme according to the invention are possible. In the examples above, the virtual disk 514 is initially in a non-sensitive state and then later transitions to the "encrypt on write" state. In some cases it may also be beneficial to allow the user to dynamically transition back to the non-sensitive state, indicating that any already-encrypted data blocks should remain encrypted, but that any subsequent modifications to unencrypted data blocks should not cause them to be encrypted. For example, this may be useful if the user wants to install an additional application after having used the VM for some time. Any conventional mechanism may be included in the system's user interface to enable the user to indicate that the EOW feature should transition to the non-sensitive state. Other transition conditions, signaling a switch to the non-sensitive state, could include a sensed change of user, a change of the active application, etc.

The usefulness of this extension may be limited if the installer for the new application accesses already-encrypted, sensitive data blocks, since it might read in and copy the encrypted data, storing sensitive data into new, unencrypted data blocks. However, such behavior could be prevented by automatically transitioning back to the "encrypt on write" state upon access to an already-encrypted data block—effectively "tainting" the rest of the data blocks written by the installer.

Declassifying Data Blocks

It may in some cases be desirable to declassify a subset of encrypted data blocks. For example, a conventional mechanism could be included to track how frequently the guest OS reads the different data blocks. Unless the data is particularly sensitive and must always be stored encrypted, declassifying such "hot" data blocks would avoid incurring the decryption overhead for them. To accomplish this, the user (or an administrator, etc.) may use any mechanism (such as those described above for indicating what should be subjected to EOW) to specify which portions of the virtual disk are to be "declassified." Each disk block B to be declassified would then be read in and decrypted, and overwritten back to B on the virtual disk. The corresponding value is Encrypted[B] should then be set to "0".

Automatic Determination of Non-sensitive Disk Allocation Units

It would be wasteful to encrypt a data block that contains only public data. In the simplest embodiment of the invention, in which all writes to the virtual disk are encrypted (after initialization of the virtual disk), this might happen, for example, when additional software (such as an upgrade) is installed in the VM. In other words, the EOW module according to the invention might be conservatively encrypting blocks that need not be protected.

Figure 4:
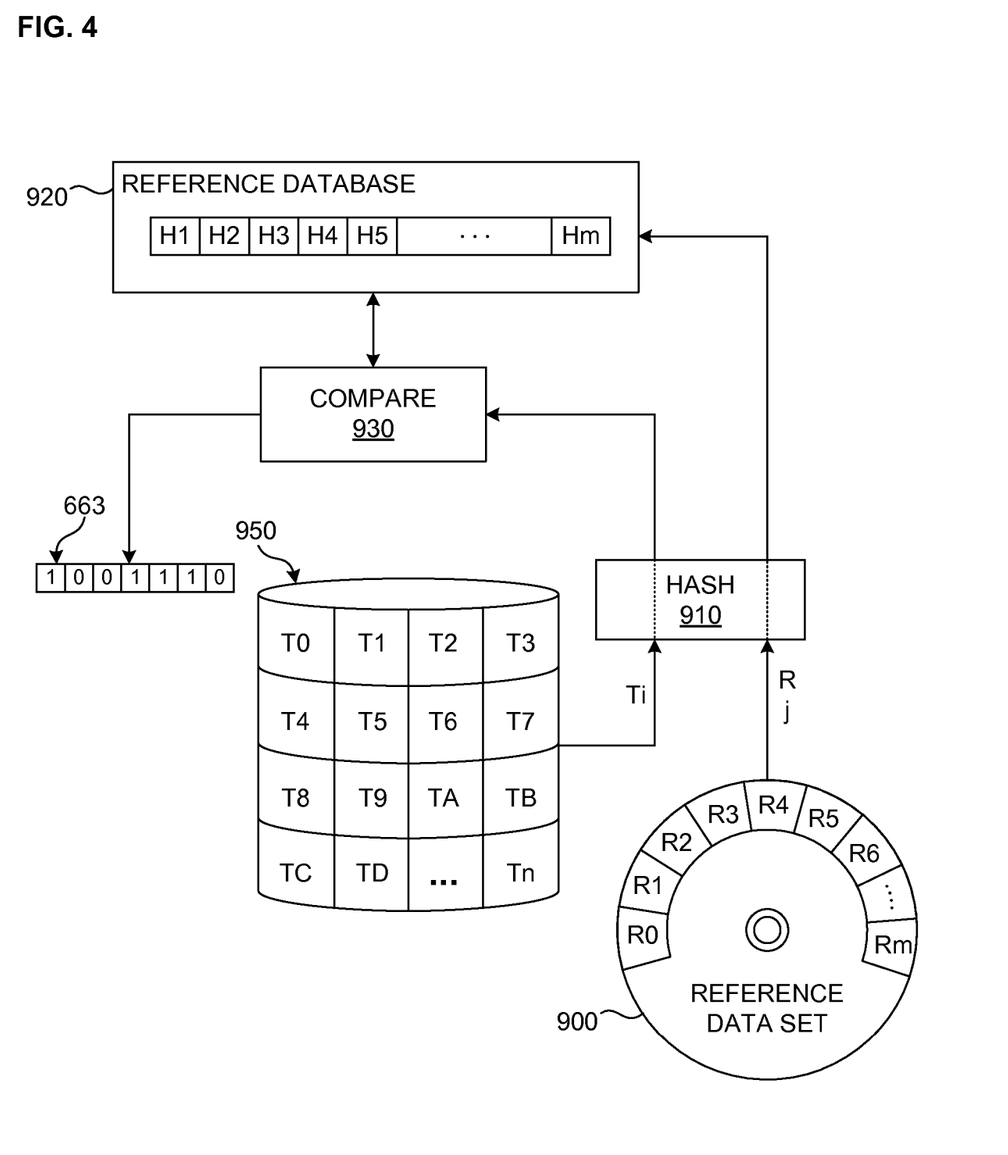
FIG. 4 shows an advanced embodiment of the invention that automatically determines which allocation units of a given reference data set should be protected by encryption.

FIG. 4 illustrates an optional feature of the invention that detects which allocation units of a test data set (such as the blocks of the virtual disk) contain public information (that need not be initially protected by encryption) and which allocation units probably do. This mechanism may be used in different ways: real-time and batch. In a real-time mode, the test data blocks are those being written to the virtual disk and are tested individually before being written to the disk—data blocks found to be non-sensitive are written "as is," that is, without encryption, whereas others will be encrypted. In a batch mode, data blocks are evaluated independently of any current write requests; indeed, the entire virtual disk (or a delta disk—see below) or any part of it may be scanned to optimize it and reduce the decryption overhead.

The first step of the procedure according to the invention for detecting which data blocks do not need to be protected by encryption is the compilation of identifying information derived from known public data blocks, such as the data blocks on installation disks of common versions of (or installed by) different operating systems and/or applications that users might install in their respective VMs. In FIG. 4, one or more such public data block sources is shown (collectively, in the case of more than one) as a "Reference Data Set" 900, since its data blocks (illustrated as R0, R1, . . . , Rm) will be compared with those of a test data set 950. For convenience, the test data (which, in the preferred embodiment of the invention, is virtual disk 514 or one of its "deltas"—see below) is shown as being divided into allocation units (here, blocks) T0, T1, . . . , Tn.

Most installed software (including operating systems) is, at least initially, identical from machine to machine since it is typically loaded from identical disks or downloaded from the same sites. Moreover, the software usually installs with the same file structure on different machines. In other words, most or at least many allocation units (blocks, pages, etc.) of one installation will usually have identical counterparts in every other installation.

According to this aspect of the invention, a reference data base 920 is compiled based on the reference data blocks R0, R1, . . . , Rm of the data set 900 (again, which may comprise the blocks of many different public data sets). A comparison procedure is then applied to determine whether a given block Ti is identical to any reference block Rj.

In the simplest case, the reference data set 900 is the data base 920, so that Ti is compared directly with the reference data blocks. For each given test data block Ti, the reference data blocks R0, R1, . . . , Rm are then searched using known routines to find a possible match. Alternatively, depending on the size of the reference data set, the database 920 could contain copies of R0, R1, . . . , Rm.

Many different known methods may be used for efficient representation of the reference data blocks R0, R1, . . . , Rm. For example, a conventional indexed structure such as a binary tree or B-tree could be used to allow fast lookups against the database 920 entries.

Alternatively, the database 920 contains not the reference data blocks themselves, but rather representations H0, H1, . . . , Hm. For example, H0, H1, . . . , Hm could be pointers to R0, R1, . . . , Rm. Only the pointers would then need to be loaded into memory when the VM is powered on.

Copying would double the storage requirement, however, which would be impractical or impossible, especially if the database 920 is to be held in memory when the VM is powered on. Consequently, the database 920 preferably contains information that uniquely and directly identifies the reference data blocks, but without having to maintain a copy or pointers.

In the preferred embodiment of the invention, the reference database 920 is implemented as a hash table, and a conventional hash routine 910 is included to evaluate the chosen hash function. As with any other hashing procedure, the hash function typically yields a single hash value (known as a "signature," "fingerprint" or "key") for each reference data block Rj in turn. In FIG. 4, these signatures are shown as H0, H1, . . . , Hm. This signature uniquely identifies the block in the sense that the probability of two different blocks hashing to the same signature is negligible. A subset (for example, low-order bits) of this signature is then used to index into the reference data base 920.

It is not necessary to identify the address of the reference data blocks from which the signatures and hash table entries are derived because these values will already be (in all but extremely rare and unfortunate cases) uniquely related to the blocks and it is the block's contents, not its location on any particular medium, that are used for comparison. Given a 128-bit hash function (for example), the probability of a false match will be much lower than the probability of failure of a physical system component.

Any conventional hash function(s) may be used within the hash module 910. Examples include the well-known SHA-1 ("Secure Hash Algorithm") routine and the MD5 ("Message-Digest Algorithm"). Skilled programmers will readily be able to choose an appropriate hash function to match the requirements of their particular implementation of the invention. The results of a plurality of different hash functions may also be "combined" in a conventional Bloom filter to reduce the storage requirements for the reference database 920 when implemented as a hash table.

To determine whether a particular test data block Ti needs to be encrypted, its contents are likewise hashed by the same hash function, that is, the hash module 910. The database (here, hash table) 920 is then consulted using a conventional comparison routine 930 to determine whether the hash of Ti matches the hash of any reference data block Rj. A match indicates that Ti corresponds to a public data block. The design and use of hash tables is well known.

The question is then what to do if a match is found, or not. If it is known that EOW has never been run on the test data set 950, then all that is needed is to make sure that is Encrypted [B] for each block B found to be public should be "0". This could be accomplished simply by initializing is Encrypted[•] to have all "0's" and doing nothing when a test data block is found to be public.

Assume, however, that the test data set is a virtual disk that has been used in an EOW-enabled virtual machine, for example, one in which additional software has been loaded or that has merged one or more complete "delta disks" (see below) into a base disk. If EOW is ON, then even the data blocks corresponding to the additional loaded software would be encrypted, even though many of these blocks would be public. The system should not allow is Encrypted[B] to be "0" for any data block B that is encrypted, because it would then never be decrypted.

Two additional problems would come from this: first, all such encrypted but public data blocks would not hash to a value in the hash table 920 (because they are in encrypted form); second, it is assumed here that one does not know beforehand which data blocks hold such encrypted program code. These problems can be overcome using a procedure for dynamic declassification: If a given block B is found to be non-sensitive (for example, using the hashing routine described above) but its corresponding value is Encrypted [B]="1", then this block B is overwritten in its decrypted form and is Encrypted[B] is set to "0". Block B will first need to be decrypted before being hashed to determine if it is non-sensitive. One optimization is to define the block with all zeroes to be a public block, with no need to perform any comparison with the database 920.

This automatic determination of non-sensitive disk allocation units does not presuppose that the target data set is a virtual disk; rather any data set amenable to EOW (including the physical disk 514) may be scanned as shown in FIG. 4 to identify which blocks should remain encrypted and need to be decrypted upon reads.

As is described above, any data block identified in the database 920 (or other structure) is—with very high probability—a non-sensitive block, so that it need not be protected by encryption. This opens up the possibility according to the invention to "scan" any given data set—both in real time and as a batch procedure—to determine which blocks are classified and which are not. This in turn makes it possible to recompute is Encrypted[•] either on demand or periodically as a background operation.

The reference database 920 need not be compiled by the user's system from install disks of applications, etc. As an alternative, a service provider (or IT administrator, etc.) could make the database 920 available on CD-ROM or via downloading and could update it periodically. The database 920 could then identify a larger set of known public blocks than may be stored anywhere in the user's system. For example, such a compiled database could include representations of units/blocks from all versions of standard software packages. This would free the user system from having to scan the virtual disk and will in many cases identify non-sensitive data blocks that the user system may not have found, for example, program code corresponding to downloaded software patches or updates.

The procedure according to the invention for determining whether a given test data block Ti is public may be put to other uses: Assume that it is unknown what program(s) are loaded in a given disk or other storage medium. Assume further that information is also stored that identifies which program, file, etc., of the reference data set each hash signature is derived from, and that the blocks of all the common versions of a set of known software are used as the reference data set. Even if no registry information is available, and even if the disk is corrupted, the invention would make it possible to determine whether any of the programs (blocks) in the reference set are loaded on the disk: If any test data block, when hashed, matches the hash of any reference data block in the database, then the corresponding program must be on the test disk. When trying to recover sensitive data from the test disk, this procedure would also quickly eliminate "uninteresting" blocks.

Copy-on-write (COW) and Delta Disks

The technique of "copy-on-write" is well known in the art of computer science. COW is typically used to allow data to be shared, in order to eliminate redundant copies of blocks of data. With COW, there is initially a plurality-to-one mapping of data block identifiers. A COW data block is typically marked read-only using known mechanisms. Any attempt to modify a read-only-marked block causes some software layer (such as the VMM) to create a private copy of the block for the writer, thus effectively "breaking" the original sharing. COW allows sharing of disk blocks where possible, but enables "private" copies when necessary, and thus makes particularly efficient use of the limited storage resource.

Another technique that has been used for several years to reduce VM demands on physical storage while still enabling the virtual disk to be "rolled" back to an earlier state is known as "delta" or "differencing" disks. See FIG. 5. According to this technique, the complete virtual disk is allocated only for its initial state, which is shown as VDISK-INIT. Every write to the virtual disk, however, is made to a separate storage region (preferably still part of vmdisk) that stores only those writes to the virtual disk that have occurred since the most recent "epoch" began. Thus, VDISK-Δ1 stores only changes (writes) since VDISK-INIT was created, VDISK-Δ2 stores changes since VDISK-Δ1's epoch ended, and so on. Any data block not found in the most recently created VDISK-m will therefore be found in some earlier VDISK-Δk (k<m) or in VDISK-INIT. The virtual disk can be returned to a previous state m−1 simply by discarding VDISK-Δm.

Figure 5:
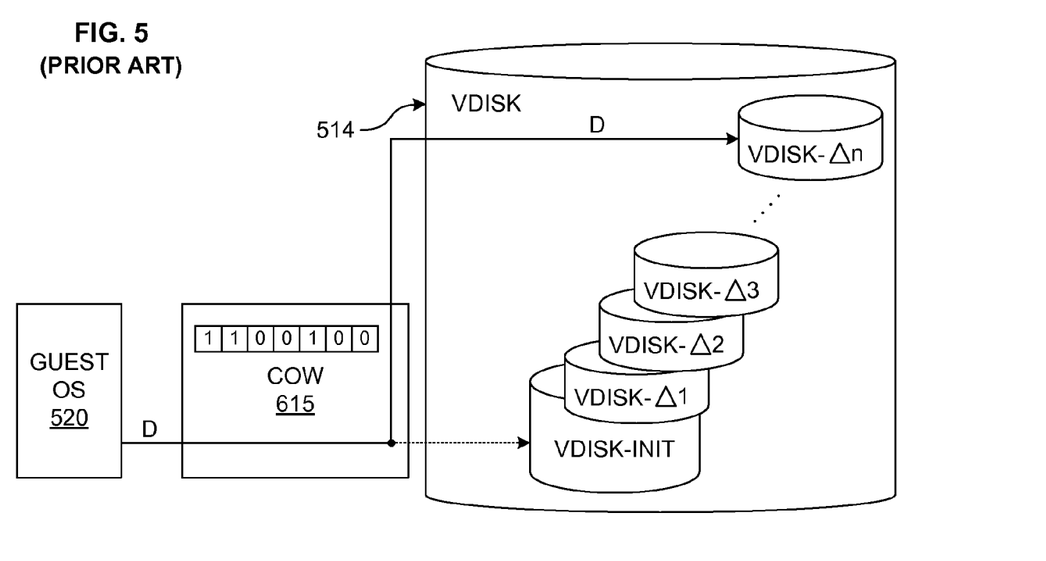
FIG. 5 illustrates the concepts of copy-on-write (COW) and delta disks.

Assume that the user is in some sense satisfied with the current state of the virtual disk; for example, a test of software has concluded successfully and the user no longer needs to maintain the delta disks and the ability to "go back" that they provide. The user may then "commit" the virtual disk so that it incorporates all changes made and recorded in the delta disks. The desktop products of VMware, Inc., have for many years incorporated both the COW technique and "delta" disks, as illustrated in FIG. 5. Thus, if shared copies of data blocks are in VDISK-INIT, private copies created as a result of the COW routine will be stored in one of the delta disks.

ECOW

EOW according to the invention may be implemented in a fashion similar to that used for COW: The address space that the virtual disk comprises may be marked "read only," using the same mechanism as for COW, and whenever the guest OS attempts to write to a marked block, the EOW module 650 encrypts it before the write. If implemented in this manner, EOW meshes naturally and efficiently with the COW disk implementation—the entire base virtual disk VDISK-INIT may be stored unencrypted, and all data written into delta disks ("redo" or "undo" logs) due to COW operations would be encrypted. The COW "trigger" can thus be used as the EOW trigger as well. Note that the time of a "commit" operation is also a particularly beneficial time to perform the declassification routine described above (in which any public data blocks are detected, overwritten in decrypted form, and marked non-sensitive).

Figure 6:
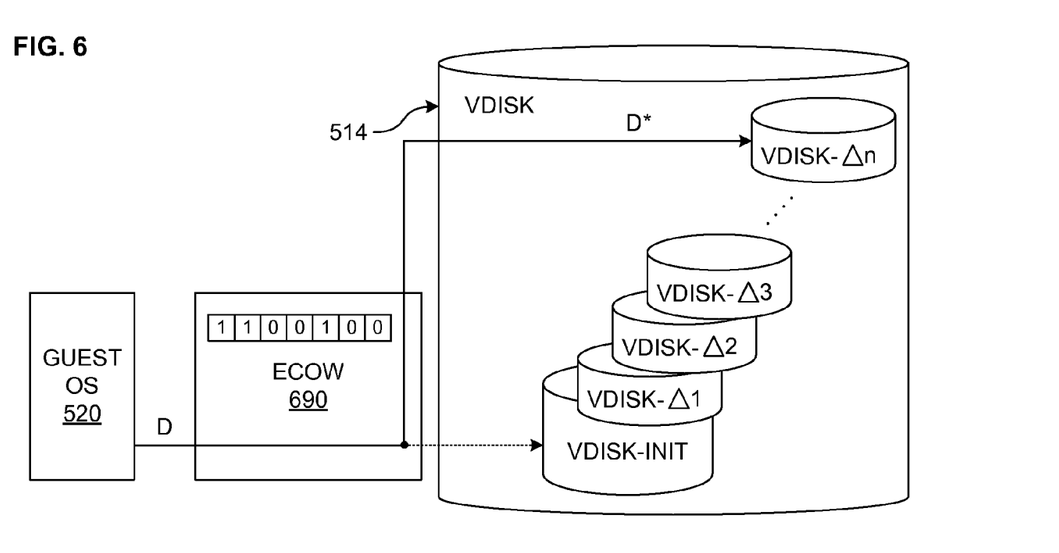
FIG. 6 shows an advanced embodiment of the invention that combines encrypt-on-write (EOW) and COW.

Since both the copy and the encryption of the data block are triggered by an attempt to write to the block, they can be combined into a single "encrypt and copy on write" (ECOW) operation. This possibility is illustrated in FIG. 6. This ECOW embodiment of the invention allows not only for a very efficient and compact implementation of the virtual disk, with full "redo" capability, but also for secure encryption of sensitive data with minimum cryptographic overheads, since unmodified data blocks (which will typically be more numerous than sensitive data blocks) will never be encrypted.

EOW in Non-Virtualized Systems

The EOW technique described above is also applicable to other more conventional operating systems and other software I/O subsystems. All that is needed is that the EOW module should be installed functionally between whatever process issues write requests and whatever device is to be written to. This could be accomplished using a driver or agent in the host OS 220. As an alternative or adjunct to the driver/agent, some software platforms use a stackable file system with a well-defined API that allows software modules (such as for compression) to be interposed between the operating system and the disk; such an interposed module could be used to allow EOW at the level of blocks, files or directories.

Note in particular that EOW according to the invention can also be applied more broadly to other non-disk storage devices, such as flash memory. In some highly-secure systems it might even be desirable to use EOW for a subset of main memory pages.

EOW and VM Migration

One advantage of virtualization technology is that it allows entire virtual machines to be migrated or cloned. Moreover, different VM configurations may be "warehoused" and made available for on-demand provisioning and deployment. In some cases, users may specify custom-configured VMs; in other cases, the user selects from a group of ready-to-install VMs.

EOW according to the invention may be used to advantage in such applications as well: In general, all the contents of a virtual disk in a pre-configured VM consist of data (which, again, from the perspective of the virtual disk includes code) that is non-sensitive. By turning on EOW according to the invention after the VM is deployed and powered on, only allocation units (such as blocks) containing potentially user-sensitive data would be encrypted. Even though the deployed VMs would initially be identical for different users who request them, they would become both personalized and secure as soon as their respective users begin to use them.

ECOW as described above is also advantageous in the case of "warehousing": Base virtual disks (VDISK-INIT) would be unencrypted since they represent the initial state of the virtual disk, but all subsequent "delta disks" would be encrypted.

We claim:

1. In a computer having a storage device, a method for storing some data in the storage device in an unencrypted form and storing other data in the storage device in an encrypted form and for selecting said some data to be stored in the unencrypted form, the computer including executable instructions for performing the method, the method comprising:

compiling a database of identifiers of allocation units, where each allocation unit contains only general-use data and each allocation unit comprises a predetermined integral multiple number of minimum I/O units of the device;

determining whether each of a plurality of test allocation units corresponds to general-use data by determining whether the test allocation unit corresponds to any identifier of allocation units of general-use data in the database;

if a test allocation unit corresponds to an identifier of allocation units of general-use data in the database, storing the test allocation unit in the unencrypted form in the storage device; and storing a plurality of test allocation units that do not correspond to identifiers of allocation units of general-use data in the database in the encrypted form in the storage device.

2. A method as in claim 1, in which:

the database is a hash table; and the step of compiling the database of identifiers comprises computing a hash value for a plurality of known general-use allocation units and making an entry in the hash table corresponding to the hash value.

3. A method as in claim 2, in which the known general-use allocation units include program code.

4. A method as in claim 2, in which the known general-use allocation units are portions of a plurality of known executable files.

5. A method as in claim 1, in which the device is a disk and the allocation units are disk blocks.

* * * * *